United States Patent [19]
Ahlenius et al.

[11] 3,961,698
[45] June 8, 1976

[54] METHOD AND APPARATUS FOR TURNING LOGS

[75] Inventors: Gösta Ahlenius, Domsjoverken; Ake Svensson, Sjalevad, both of Sweden

[73] Assignee: Mo och Domsjo AB, Ornskoldsvik, Sweden

[22] Filed: Dec. 26, 1974

[21] Appl. No.: 536,686

Related U.S. Application Data

[63] Continuation-in-part of Ser. No. 381,293, July 20, 1973, abandoned.

[30] Foreign Application Priority Data

July 31, 1972   Sweden............................... 9968/72

[52] U.S. Cl.................................. 198/25; 198/210; 198/238; 214/1 BC; 214/152
[51] Int. Cl.²......................................... B65G 49/00
[58] Field of Search ............. 198/238, 239, 240, 25, 198/246, 257, 261, 262, 282, 210, 20 R; 214/1 Q, 6.5, 1 BB

[56] References Cited

UNITED STATES PATENTS

| | | | |
|---|---|---|---|
| 2,643,778 | 6/1953 | Socke .................................. | 198/240 |
| 3,322,290 | 5/1967 | Ahlstedt...................... | 198/240 X R |
| 3,389,777 | 6/1968 | Rysti................................... | 198/262 |
| 3,603,446 | 9/1971 | Maxey et al......................... | 198/262 |

FOREIGN PATENTS OR APPLICATIONS

| | | | |
|---|---|---|---|
| 1,182,911 | 1/1959 | France................................ | 214/6.5 |

*Primary Examiner*—Frank E. Werner

[57] ABSTRACT

Process and apparatus are provided for turning logs arranged in a row so that the root ends of all the logs are pointed in the same direction. A log whose root end is to be re-oriented is gripped while being conveyed along a first conveying path, and while proceeding in the conveying direction, and turned about an axis equidistant from both ends of the log, after which the turned log is placed on a second conveying path.

22 Claims, 5 Drawing Figures

METHOD AND APPARATUS FOR TURNING LOGS

This application is a continuation-in-part of Ser. No. 381,293, filed July 20, 1973 and now abandoned.

Turning apparatus for turning logs proceeding on a conveying path so that the root or crown ends, respectively, point in the same direction are usually arranged either between two conveyors lying on the same centre line, or between two conveyors placed at right angles to each other. In the first case the logs are turned through 180°, and in the second case through 90°. As a rule, the logs are turned about an axis through the centre of gravity of the log.

This is however a great disadvantage, as the centre of gravity of the logs generally lies considerably nearer the root end of the log than the crown end. Because of this, since only some of the logs are turned (those which were the wrong way round to start off with), the turned logs lie with their ends at different distances from the logs that have not been turned and in unfavorable cases the turned and nonturned logs may even overlap. Which logs overlap, when the logs proceed along a right-angled conveying path, depends on the direction in which the turned logs have been turned.

A further disadvantage of the known turning apparatus is that a log is not held fast while it is being turned, and therefore the log has to be stopped before it can be turned.

In accordance with the invention, a process is provided for orienting logs having a root end and a crown end and arranged in a row so that all the logs in the row have their root ends pointing in the same direction, which comprises arranging the logs in a row; conveying the logs along a first conveying path; gripping selected logs in sequence at approximately their mid-point intermediate the root and crown ends of the logs in a manner to permit turning them, and turning selected gripped logs about an axis intermediate the root and crown ends of the logs as required to orient the roots of all logs in the row in the same direction, while maintaining continued conveying movement of the logs; and transferring the oriented logs to and conveying the oriented logs along a second conveying path.

The logs can be conveyed in an approximately horizontal plane along the conveying paths or in a plane deviating from the horizontal along the conveying paths, as desired, and also the logs can be turned in a horizontal plane, or in a non-horizontal plane, as desired. It is preferred that the logs be moved in a plane approximately parallel to the plane of movement of the logs along the conveying paths, while gripping and turning the logs.

Also in accordance with the invention, an apparatus is provided for orienting logs having a root end and a crown end and arranged in a row so that all the logs have their root ends pointing in the same direction, which comprises, in combination, a conveyor for conveying the logs arranged in a row one after the other along a conveying path; means for gripping selected logs in sequence at a point intermediate their root and crown ends for removing selected logs from the row at one location, turning the selected logs about an axis intermediate the ends thereof, and returning the selected turned logs to the row on the conveyor at another location, while maintaining continued conveying movement of the logs, and arranged to move in a plane approximately parallel to the plane of movement of the conveyor and along a circular path, meeting the conveying path at the one and the other locations; and means for rotating the gripping means to turn the gripped logs about said axis.

In the preferred embodiment, the gripping means comprise a plurality of downwardly-directed grippers securely holding the logs, and the turning means comprises a track which defines a circular path, and a plurality of carriages are movable along the track, for carrying the gripping means along the circular path. Means also is provided for moving the gripping means (and carriages) at approximately the conveying speed while gripping the logs.

Each gripping means can be supported at one end of an arm, which is rotatably supported at its opposite end in a manner such that the gripping means is moved along the circular path when the arm rotates about its axis.

The apparatus also can comprises sensing means for detecting the facing direction of a root end of a log in the row and means for actuating the gripping means for turning the log only when the root end is facing the wrong way.

One or a plurality of conveyors can be provided. There can be two conveyors, one for conveying the logs to the gripping means, and one for conveying the logs from the gripping means, the gripping means transferring the logs from one conveyor to the other, and turning selected logs while so doing. To conserve space, the two conveyors are arranged at an approximately 90° angle to each other, and the circular path of the gripping means carries the gripping means about a 90° arc during the transfer, thus reducing the turning arc of the selected turned logs.

The gripping means can grasp each log, turn only selected logs, and transfer each log to the second conveyor. This is the best arrangement when two conveyors at a 90° angle are used, since all logs have to turn the 90° corner. If however one in-line conveyor is used in two sections, it is possible to avoid this embodiment, and having the gripping means grasp only selected logs, turn them, and transfer the turned logs to the second conveyor. In this case, the conveyor has two in-line sections, before and after the gripping means.

Because the logs are turned about their mid-point, and because the log while gripped and turned proceeds at the same conveying speed, the logs retain their spacing along the conveyor. By gripping the logs during the turning operation, turning can take place without arresting the forward movement of the logs along the conveyor.

The drawings illustrate two preferred embodiments of apparatus according to the invention, in which.

The turning apparatus shown in FIGS. 1 to 4 has a first conveyor 1 and a second conveyor 2, each having endless conveying elements provided with transverse flights for the longitudinal conveying of logs. The flights on conveyor 2 are slightly concave. The conveyors 1, 2 are at a right angle to each other, and conveyor 1 is at a somewhat higher level than conveyor 2. The turning apparatus 3 for the logs is arranged in the 90° angle formed by conveyors 1 and 2. The turning apparatus includes a circular rail or track 4, which is fixedly positioned at a higher level than the conveying path, and so arranged that for a distance corresponding to about 150° of its its circumference it overlaps both conveyors. The rail 4 carries three identical carriages 5, 6, 7 (see FIG. 2,) each of which is provided with an electric motor for individual propulsion along the rail.

Figure 1:
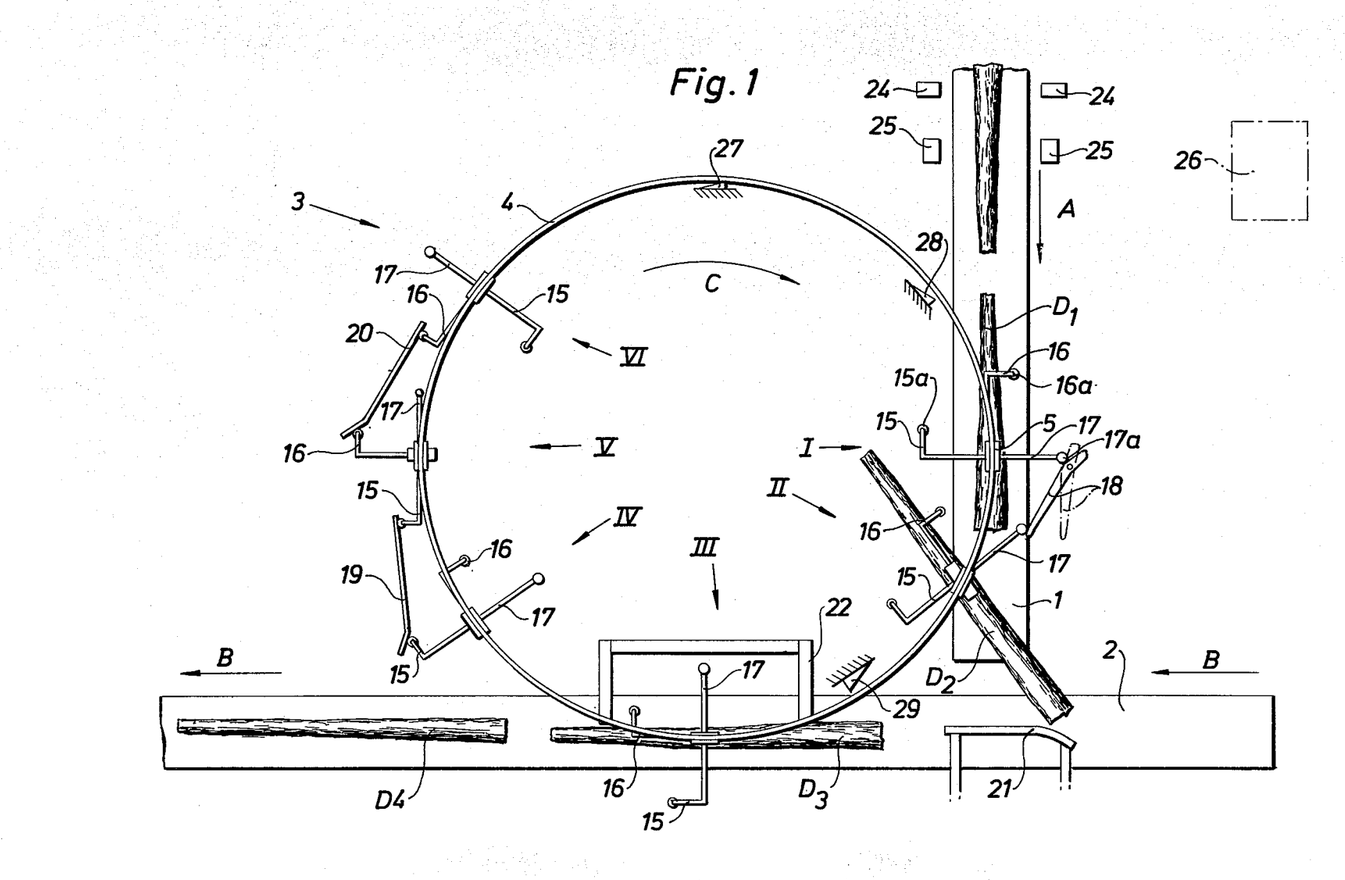
FIG. 1 is a plan view of one embodiment of a turning apparatus utilizing two conveying paths at a right angle to each other, with only one of the three log-turning carriages of the turning apparatus shown in six different positions.

To simplify the representation, only the carriage 5 has been shown in FIG. 1, and this is shown in its six successive different positions, designated I, II, III, IV, V, VI. Each carriage 5, 6, 7 is provided with driving wheels 12 (see also FIG. 3), and has a gripping device 11, which is rotatable on axle 30 (see also FIG. 4) in a horizontal plane with respect to the carriage frame 13. The axle 30 is journalled in bearings 47 and 48 on the carriage 13 gripping member 11, respectively. The axle 30 is prevented from being moved axially in the bearings 47, 48 by virtue of a plate 49 welded to the upper end of the axle, and a stop ring 54 fixed to the lower end of the axle by means of a cylindrical pin 52.

The gripping devices 11 are provided with downwardly directed, pivotably opened and closed grippers 14, each of which has three angularly shaped fixed guide arms 15, 16, 17. The arm 16 is at right angles to arms 15 and 17, which are at an angle of 180°. Arms 15 and 16 are in the same horizontal plane, while arm 17 is affixed to the gripping device at a somewhat higher level, with the angular portion of the arm directed upwards. At their free ends the guide arms 15 and 16 are provided with wheels 15a, 16a, rotatable about a vertical axis. Roller 17a is rotatably arranged about the vertical portion of guide arm 17. The pivotable opening and closing of the gripping devices 11 are operated by electric motors, not shown in the Figures. Conveyors 1, 2 and carriages 5, 6, 7 are provided with electronic speedometers, not shown in the Figures.

Gripping device 11 can be brought into two different and distinct turning positions, shown in positions I and III in FIG. 1. By means of spring-loaded locking devices not shown in the Figures, the gripping devices are prevented from unintentionally turning, e.g. due to vibrations in the installation. Three guide rails 18, 19, 20 are arranged adjacent rail 4 between the positions I –II, IV – V and V – VI in FIG. 1. The guide rails 19, 20 are fixedly placed in the same horizontal plane as the guide arms 15, 16, while guide rail 18 is pivotally journalled to swing in the same horizontal plane as the upwardly directed part of the guide arm 17. Guide rails 19 and 20 extend slopingly inwards towards rail 4, seen in the direction of movement (arrow C) of carriages 5, 6, 7. Guide rail 18 can be put into actuating or nonactuating position by a motor, not shown. These positions are shown in FIG. 1 by solid and dashed lines, respectively.

Figure 2:
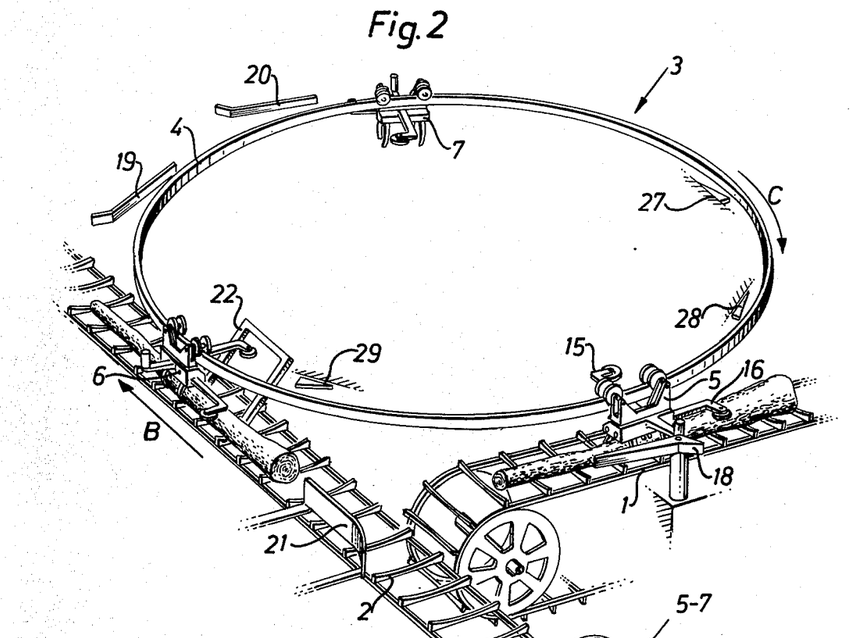
FIG. 2 is a perspective view of the apparatus of FIG. 1, showing all three log-turning carriages on the rail.

Directly in front of conveyor 1 an arcuate guide rail 21 is fixed somewhat above conveyor 2. In FIGS. 1 and 2 the conveying direction of conveyors 1, 2 as well as the direction of movement of carriages 5, 6, 7 have been shown by the arrows A, B and C, respectively.

In FIG. 1, a log in the process of being turned is shown in the four sequential positions, designated $D_1$, $D_2$, $D_3$ and $D_4$.

On the same side of conveyor 2 as the turning apparatus there is a downwardly sloping slide path 22 arranged opposite to the carriage position III.

A crown-root indicator 24 and a half-length finder 25 are arranged in a position to inspect the logs along conveyor 1. These measuring devices are of a conventional kind, with lamps, photocells and signal generators, and are only schematically shown on the Figures. An electronic computer 26 with a memory function and a control unit is connected to the crown-root indicator 24 and the pivoting motor for guide rail 18, and also the speedometers and driving motors for conveyors 1 and 2 and the carriages 5, 6, 7.

The apparatus of FIGS. 1 to 4 functions in the following manner:

From a pile not shown in the Figures, the logs are conveyed individually on conveyor 1 to the turning apparatus 3, the spacing of the logs on the conveyor generally being uniform in the normal case. Beyond the turning apparatus 3 the logs are to be conveyed further on conveyor 2, now all with their crown ends pointing in the conveying direction.

For a log on conveyor 1 that has its crown end already pointing in the conveying direction, no turning is needed, and transfer to conveyor 2 is comparatively simple. The log is gripped by a gripping device 11 on one of the carriages 5, 6, 7 and is taken by the carriage along rail 4 until it is essentially parallel with conveyor 2, when it is dropped onto the conveyor (FIG. 2 shows this case).

For a log on conveyor 1 that has its root end pointing in the conveying direction, transfer is somewhat more complicated, and is described in detail below.

When a log conveyed by conveyor 1 passes the crown-root-indicator 24 the indicator registers whether the crown end or the root end of the log is first, and gives a signal to this effect. The signal goes via computer 26 to a relay for the pivoting motor of the guide rail 18. If the log passes the crown-root-indicator with the crown end first (but it may also be the root end) the signal causes the guide rail 18 to be brought into or to remain in the nonactuating position (the one indicated by dotted lines in FIG. 1). (See also FIG. 2). On the other hand, if the log passes the crown-root-indicator with the root end first (but this may also be the crown end) the guide rail 18 is brought into or remains in the actuating position (the one shown in solid lines in FIG. 1), as a result of the signal from the crown-root-indicator. When the log passes the half-length finder 25 a little later, this registers the points in time when it is passed by the forward and rear ends of the log. The registered values are immediately transferred to the computer 26, where they are compared with the values for the speeds and positions of the carriages on rail 4, together with the speeds of conveyors 1 and 2, which are continuously transmitted to the computer. These values are transformed by the computer to two outgoing signals. The one signal is taken to a relay for the motor to the carriage immediately previous to position I (FIG. 1), the speed of the carriage being thereby automatically adjusted, partly so that the carriage passes position I simultaneously with the mid-point of the log, partly so that the carriage at the moment of passage has approximately the same speed as the log.

Before the carriage arrives at position I, it passes the fixed protruding tripper 27, by which the switch to the grippers 14 on the gripping device is set so that the grippers open. Immediately before the carriage passes position I, the switch is reset in a similar way by the fixed protruding tripper 28, so that the grippers seize the mid-point of the log at the moment when, together with the carriage, the log passes position I. carriage When the carriage and the wrongly-turned log pass the guide rail 18, which is in the actuating position, the upright roller 17a on the guide arm 17 of the gripping device rolls along the guide rail, whereupon gripping device 11 and the log are turned about 60° counterclockwise, into position II, FIG. 1. At the end of the rotating movement, the root end of the log contacts the fixed guiding rail 21, the root end gliding along this, and the gripping device 11 and log are further turned counterclockwise until the log is nearly parallel with conveyor 2, in position III. Turning the log takes place without its being lifted to a level above conveyor 1. When the carriages passes the fixed protruding tripper 29, the switch to the grippers 14 is reset, whereupon the grippers open, and drop the log onto conveyor 2, in position III. During its falling movement from the gripping means 11 to conveyor 2, the log glides down slide path 22. In this way, the log is further turned slightly counterclockwise in a horizontal plane, so that it is essentially parallel to conveyor 2 when it lands on the conveyor. When the log has been released by the gripping device, the gripping device exhausts the rest of its turning kinetic energy until, between positions III and IV, it is prevented by its spring-loaded locking device (not shown) from unintentionally turning further.

The other signal from the computer 26 is also fed to the relay for the carriage propulsion motor, but first after the carriage and the log have left position I. This signal controls the speed of the carriage and the log so they have approximately the same speed as conveyor 2 on passing position III. The speeds of both the conveyors are normally the same, but the speed of conveyor 2 can be higher or lower than the speed of conveyor 1, if it is desired to increase or decrease, respectively, the spacing of the logs.

When the log has been delivered to position III, the carriage continues. On passing the fixed guide rails 19 and 20, the wheels 15a and 16a of the respective guide arms 15 and 16 on the gripping means reach engagement with the guide rails, the gripping device then being rotated half a revolution to the original position, in which it is once again locked by its spring-loaded locking device, and proceeds in a relatively unaltered position towards position I.

If a log already has the crown end (the right end) pointing in the conveying direction on conveyor 1, the log is not rotated, as has already been said. In this case the guide rail 18 is caused by a signal from the crown-root indicator 24 to pivot to its nonactuating position (shown by dotted lines in FIG. 1). The speed of the carriage immediately preceding position I is controlled in the same way as has been described in the first example. This means that the carriage and the middle portion of the log simultaneously pass position I, and that the carriage and the log have essentially the same speed at the moment of passage. As before, the gripper is operated by its switch being reset on contact with the protruding trippers 27, 28, 29, in that order, when being passed by the carriage. Thus, the gripper seizes the log, but since the guide rail 18 is not reached by guide arm 17 on the carriage, because it is in the nonactuating position, no rotation of the gripping device and the log relative to the carriage takes place. Instead, the log retains a position coinciding with a tangent to the circular rail at every moment until it is dropped onto conveyor 2 in position III. When the carriage during continued movement along the rail passes the guide rails 19 and 20, the guide arm 17 goes past and above the guide rails without being affected by them.

The turning cycle is repeated in one of the two ways described for every log, depending on whether the end of the log on input conveyor 1 is facing the right or the wrong way to turning apparatus 3.

A plurality of modifications of the turning apparatus of FIGS. 1 to 4 are possible within the framework of the invention. For instance, the monorail rail or track may be quite well replaced by a vertical shaft at its centre, on which one or more arms are rotatably journalled at the one end, in a plane coinciding with that of the monorail.

Each of the arms, having a length corresponding to the radius of the rail 4, supports a gripping device at its free end, rotatable in a horizontal plane and provided with grippers. Rotating the arms and the gripping device, together with the operation of the grippers, can in principle take place in the same way as for the corresponding devices for the monorail.

Neither is it necessary for the turning apparatus of FIGS. 1 to 4 to have three carriages, but it can have one or two or any suitable number. If only one carriage or turning arm is provided, it can even be arranged for a reciprocating movement along an arcuate path above the conveyors.

The guide arms 15, 16, 17 and the guide rails 18, 19, 20, 21 for rotating the gripping devices of the carriages, as shown in FIGS. 1 to 4, can also be replaced by other suitable means. This also applies to the protruding trippers 27, 28, 29 for operating the grippers.

The turning apparatus in FIGS. 1 to 4 has been described as co-acting between two conveying paths at a 90° angle and with two conveyors, arranged in different horizontal planes. One can however have both the conveyors arranged in one and the same horizontal plane and/or one or both of these planes can slope in a certain direction. If it is so desired, the monorail track or the turning arms can then be arranged for movement in a plane parallel with one of the sloping conveyors.

If the conveyor fed by the turning apparatus is arranged at the same level as the input conveyor, or higher than it, it is then necessary that the logs which are to be turned be lifted from the input conveyor before and/or during the turning operation so that on turning and transfer to the output conveyor they go free from its edges.

With an installation as shown in FIGS. 1 to 4, i.e. with the input conveyor arranged at a higher level than the output conveyor, rotation of the logs can take place without these first being lifted up from the input conveyor 1. Although in the device of FIGS. 1 to 4 the logs are turned in a horizontal plane, turning can take place in the vertical plane or in any other plane. If turning be done in a plane other than the horizontal plane, it is naturally necessary that the log be first removed from the input conveyor in such a way that turning is not hindered by this conveyor.

It is also possible to arrange the turning apparatus between two sections of a straight conveying path, which can then have a single conveyor or two in-line conveyors. These can also be arranged in different planes. This is illustrated in FIG. 5.

Figure 5:
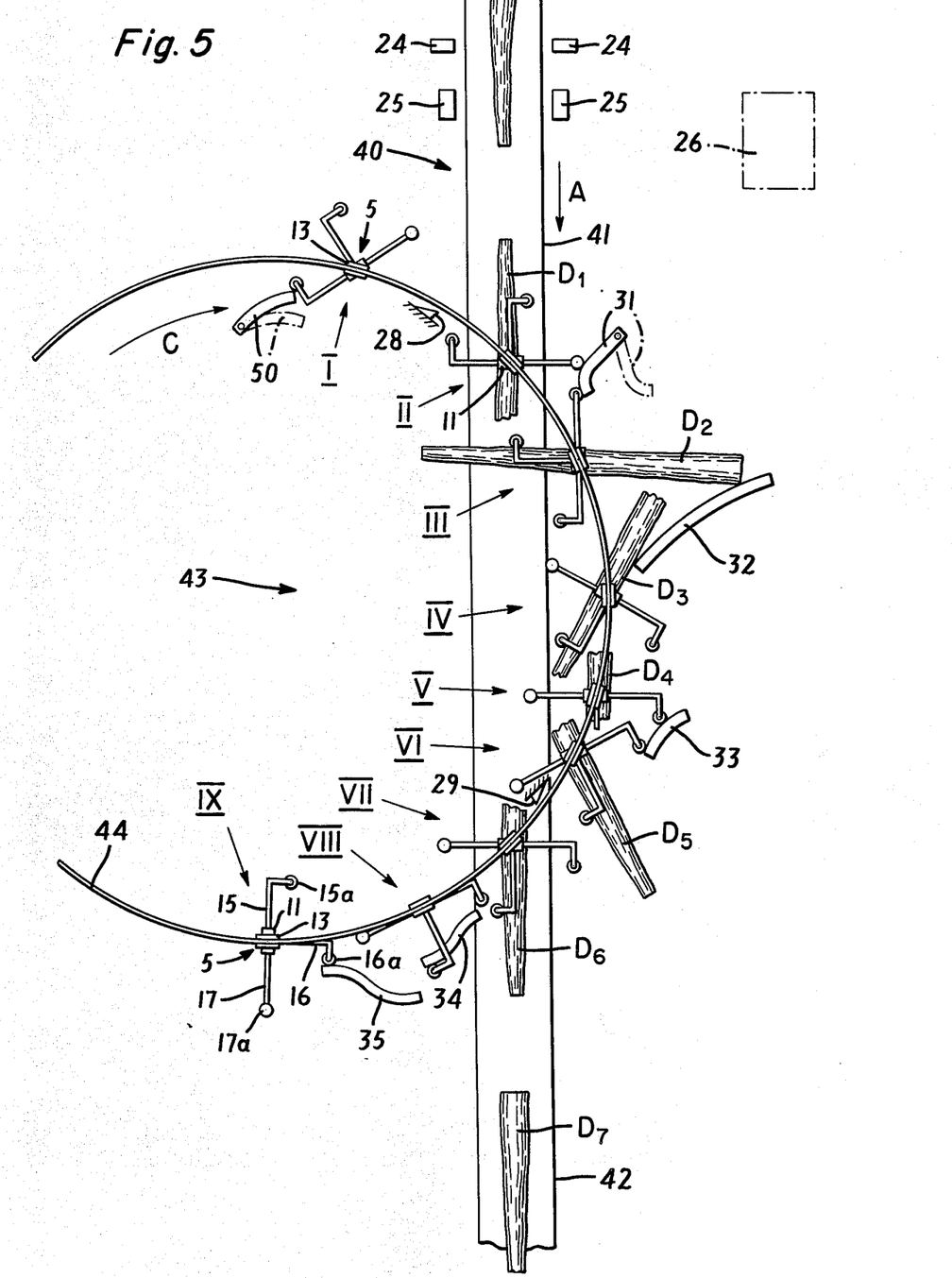
FIG. 5 is a plan view of another embodiment of turning apparatus utilizing two conveying paths in-line.

The turning apparatus shown in FIG. 5 has a single conveyor 40 in two sections, 41, 42, each having endless conveying elements provided with transverse slightly concave flights for the longitudinal conveying of logs. The sections 41, 42 are in line with other, at the same level. The turning apparatus 43 for the logs is arranged to cross the path of the conveyor 40 in overlapping relation for about 150° of its circumference. The turning apparatus includes a circular rail or track 44 which is fixedly positioned at a higher level than the conveying path. The rail 44 carries three identical carriages 5, 6, 7 of the same type as the turning apparatus of FIGS. 1 to 4, each of which is provided with driving wheels 12 (see also FIG. 3), and an electric motor for individual propulsion along the rail.

To simplify the representation, only the carriage 5 has been shown in FIG. 5, and this is shown in nine successive different positions, designated I, II, III, IV, V, VI, VII, VIII, IX.

Figure 3:
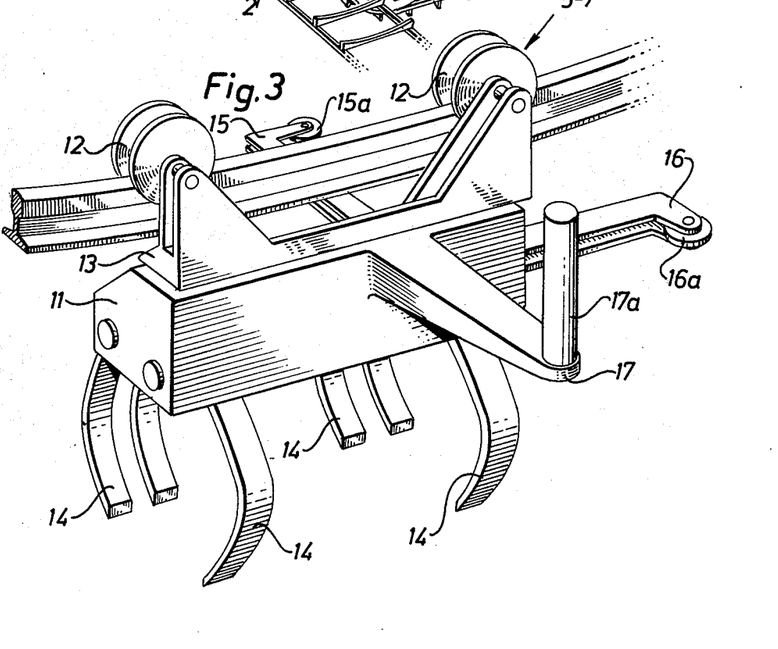
FIG. 3 is a perspective view on a larger scale of a carriage of the apparatus of FIGS. 1 and 2.
Figure 4:
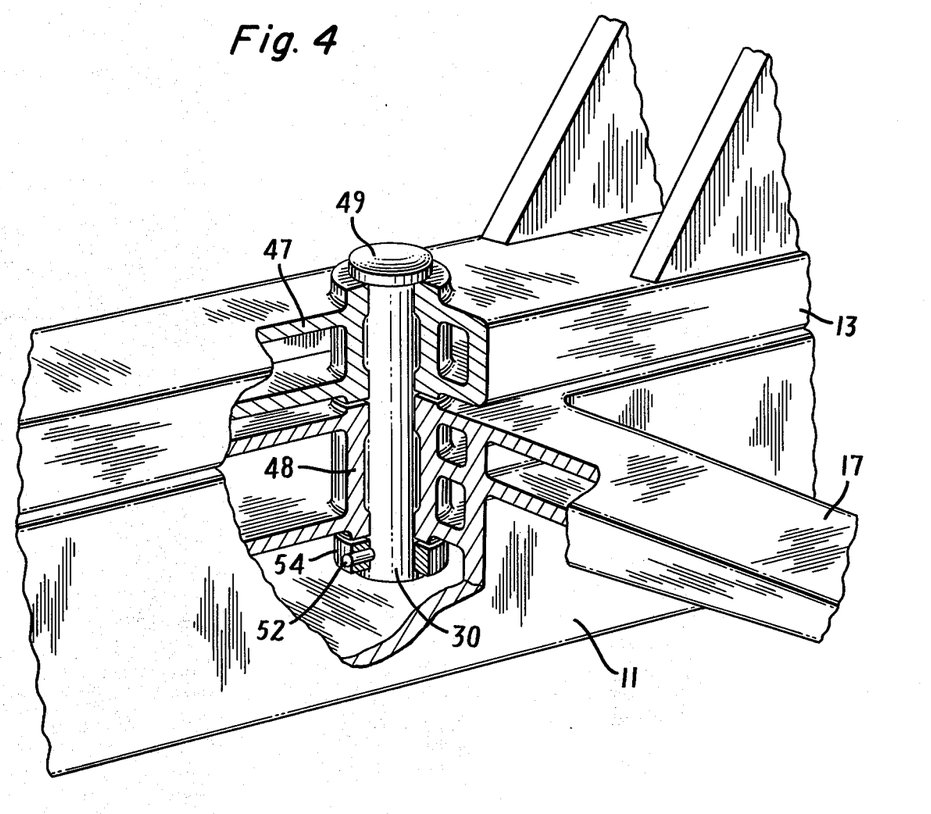
FIG. 4 is a detail of the gripping device of FIGS. 1 and 2.

Each carriage 5 has a gripping device 11, which is rotatable in a horizontal plane with respect to the carriage frame 53. The gripping devices 51 as shown in FIG. 3 are provided with downwardly directed, pivotably opened and closed grippers 14, each of which has three angularly shaped fixed guiding arms 15, 16, 17. The arm 16 is at a right angle to arms 15 and 17, which are at an angle of 180°. Arms 15 and 16 are in the same horizontal plane, while arm 17 is affixed to the gripping device at a somewhat higher level, with the angular portion of the arm directed upwards. At their free ends the guiding arms 15 and 16 are provided with wheels 15a, 16a, rotatable about a vertical axis. Roller 17a is rotatably arranged about the vertical portion of guide arm 17. The pivotable opening and closing of the gripping devices 11 are operated by electric motors, not shown in the Figures. The conveyor 40 and carriages 5, 6, 7 are provided with electronic speedometers, not shown in the Figures.

Gripping device 11 can be brought into two different and distinct turning positions, shown in positions II and VII in FIG. 5. By means of spring-loaded locking devices not shown in the Figures, the gripping devices are prevented from unintentionally turning, e.g. due to vibrations in the installation. Three guide rails 31, 32, 33, are arranged adjacent rail 44 between the positions II–III, III–IV and IV–VI in FIG. 5. The guide rails 31, 33 are fixedly placed in the same horizontal plane as the guide arm 15, 16, while guide rail 32 is in the same horizontal plane as the log carried by the gripping means 11. Guide rails 32, 33 extend slopingly inwards towards rail 44, seen in the direction of movement (arrow C) of carriages 5, 6, 7. Guide rail 31 can be put into actuating or a nonactuating position by a motor not shown. These positions are shown in FIG. 5 by solid and dashed lines, respectively.

Directly in front of conveyor 40 an arcuate guide rail 50 is fixed somewhat above the conveyor. In FIG. 5 the conveying direction of conveyor 40 as well as the direction of movement of carriages 5, 6, 7 have been shown by the arrows A, B and C, respectively.

In FIG. 5, a log in the process of being turned is shown in the seven sequential positions, designated $D_1$, $D_2$, $D_3$, $D_4$, $D_5$, $D_6$, and $D_7$.

A crown-root indicator 24 and a half-length finder 25 are arranged in a position to inspect the logs along section 41. These measuring devices are of a conventional kind, with lamps, photocells and signal generators and are only schematically shown in the Figure. An electronic computer 26 with a memory function and a control unit is connected to the crown-root indicator 24 and the pivoting motor for guide rail 18, and also the speedometers and driving motors for conveyor 40 and the carriages 5, 6, 7.

The apparatus of FIG. 5 functions in the following manner:

From a pile not shown in the Figures, the logs are conveyed individually on conveyor 40, section 41, to the turning apparatus 43, the spacing of the logs on the conveyor generally being uniform in the normal case. Beyond the turning apparatus 43 the logs are conveyed further on conveyor 40 section 42, with their crown ends facing in the conveying direction.

For a log on conveyor 40 that has its crown end already pointing in the conveying direction, no turning is needed, and the log is not gripped by a gripping device 11 on one of the carriages, but continues on its way on the conveyor 40 into section 42.

A log on conveyor 40 that has its root end pointing in the conveying direction is picked up and turned by a gripping means 11.

When a log conveyed by conveyor 40 passes the crown-root-indicator 24 the indicator registers whether the crown end or the root end of the log is first and gives a signal to this effect. The signal goes via computer 26 to a relay for the pivoting motor of the guide rail 18. If the log passes the crown-root-indicator with the crown end first (but it may also be the root end), the signal causes the guide rail 31 to be brought into or to remain in the nonactuating position (the one indicated by dotted lines in FIG. 5). On the other hand, if the log passes the crown-root-indicator with the root end first (but this may also be the crown end), the guide rails 50, 31 are brought into or remain in the actuating position (the one shown in solid lines in FIG. 5), as a result of the signal from the crown-root-indicator. When the log passes the half-length finder 25, a little later, this registers the points in time when it is passed by the forward and rear ends of the log. The registered values are immediately transferred to the computer 26, where they are compared with the values for the speeds and positions of the carriages on rail 44, together with the speed of conveyor 40 which are continuously transmitted to the computer. These values are transformed by the computer to two outgoing signals. The one signal is taken to a relay for the motor to the carriage immediately previous to position I (FIG. 5), the speed of the carriage being thereby automatically adjusted, partly so that the carriage passes position II simultaneously with the mid-point of the log, partly so that the carriage at the moment of passage has approximately the same speed as the log.

Before the carriage 5 arrives at position I, the gripper passes the pivotable guide rail 50, by which the switch to the gripper 14 on the gripping device is set so that the grippers open. Immediately before the carriage passes position II, the switch is reset in similar way by the fixed protruding tripper 28, so that the grippers seize the mid-point of the log at the moment when, together with the carriage, the log in position $D_1$ enters position II.

When the carriage and the wrongly-turned log pass the guide rail 31, which is now in the actuating position, the upright roller 17a on the guide arm 17 of the gripping device rolls along the guide rail, whereupon gripping device 11 and the log are turned about 60° counterclockwise, to position III, $D_2$ according to FIG. 5. At the end of the rotating movement, the root end of the log contacts (position $D_3$) the fixed guide rail 32, the root end gliding along this, and the gripping device 11 and log are further turned counterclockwise, to position $D_4$, until the log is nearly parallel with conveyor 40, in position V. When the carriage passes the fixed rail 33 and the protruding tripper 29, position VI, the switch to the grippers 14 is reset, whereupon the grippers open, and drop the log onto conveyor 40, section 42, in position VII. In this way, the log is set down essentially parallel to conveyor 40. When the log has been released by the gripping device, the gripping device exhausts the rest of its turning kinetic energy between VII, VIII.

In the embodiments shown in the drawings, the logs after turning upon transfer to the conveyor 40 in section 42 have essentially the same speed as the conveyor. However, one can let transfer take place while the conveyor and/or the carriage or the turning arm, respectively, have been stopped temporarily.

The other signal from the computer 26 is also fed to the relay for the carriage propulsion motor, but first after the carriage and the log have left position I. This signal controls the speed of the carriage 5 and the log so they have approximately the same speed as conveyor 40 on passing position VII.

If desired, the conveyor 40 can be divided into two separate conveyors in sections 41, 42, which can operate at the same speed, or at different speeds. The second conveyor following the turning apparatus 43 can for instance operate at a higher speed than the first if it is desired to increase the spacing of the logs, and at a slower speed to decrease the spacing of the logs.

On passing the fixed guide rails 34, 35, the wheels 15a and 16a of the respective guide arms 15 and 16 on the gripping means reach engagement with the guide rails, the gripping device then being rotated half a revolution to the original position, in which it is once again locked by its spring-loaded locking device. The carriage then continues, with the gripping device in a relatively unaltered position, towards position I.

If a log already has the crown end (the right end) pointing in the conveying direction on conveyor 40, the log is not picked up and turned, as has already been said. In this case the guide rails 30, 31 are caused by a signal from the crown-root-indicator 24 to pivot to their nonactuating positions (shown by dotted lines in FIG. 1). The speed of the carriage immediately preceding position I is controlled in the same way as has been described in FIGS. 1 to 4. This means that the carriage and the middle portion of the log simultaneously pass position I, but the gripper means 11 is not set, and the log is not picked up. The rail 50 does not rotate the gripper, so that its switch does not contact the protruding trippers 28, 29, when passed by the carriage. The guide rail 31 is not reached by guide arm 17 on the carriage because it is in the nonactuating position. In this way, no rotation of the gripping device relative to the carriage takes place. When the carriage, during continued movement along the rail, passes the guide rails 34 and 35, the guide arm 17 goes past and above the guide rails without being affected by them.

The turning cycle is repeated in one of the two ways described for every log, depending on whether the end of the log on conveyor 40 is facing the right or the wrong way to turning apparatus 43.

A plurality of modifications of this turning apparatus also are possible, within the framework of the invention. For instance, the monorail rail or track 43 may be replaced by a vertical shaft at its centre, on which one or more arms are rotatably journalled at the one end, in a plane coinciding with that of the monorail.

Each of the arms, having a length corresponding to the radius of the rail 44, supporting a gripping device at its free end, rotatable in a horizontal plane and provided with grippers. Rotating the arms and the gripping device, together with the operation of the grippers, can in principle take place in the same way as for the corresponding devices for the monorail.

Neither is it necessary for the turning apparatus 43 to have three carriages, but it can have one or two or any suitable number. If only one carriage or turning arm is provided it can even be arranged for a reciprocating movement along an arcuate path above the conveyors.

The guide arms 15, 16, and 17 and the guide rails 50, 31, 32, 33 34, 35 for rotating the gripping devices of the carriages as shown in FIG. 5 can also be replaced by other suitable means. This also applies to the protruding trippers 28, 29 for operating the grippers.

If instead of one conveyor one has two conveyors in-line, one can have both the conveyors arranged in one and the same horizontal plane, and/or one or both of these planes can slope in a certain direction. If it is so desired, the monorail track or the turning arms can then be arranged for movement in a plane parallel with one of the sloping conveyors.

If the second conveyor fed the turning apparatus is arranged at the same level as the input conveyor, or higher than it, it is then necessary that the logs which are to be turned be lifted from the input conveyor before and/or during the turning operation so that on turning and transfer to the output conveyor they go free from its edges.

With an installation as shown in FIG. 5 above, rotation of the logs can take place without these first being lifted up from the conveyor 40. Although it has been shown in FIG. 5 that the logs are turned in a horizontal plane, turning can take place in the vertical plane or in any other plane. If turning is done in a plane other than the horizontal plane, it is naturally necessary that the log be first removed from the conveyor in such a way that turning is not hindered by this conveyor.

One can also arrange the turning apparatus so that the conveying movement of the logs is stopped during the whole or part of the time during which lifting and-/or turning of the logs takes place, the conveyor being also stopped.

The crown-root-indicator 24 and the half-length finder 25 for the logs need not be in the form described in the devices shown in the drawings, but any other suitable implementation whatsoever may be used. One can thus quite well replace these with for example corresponding instruments provided with supersonic devices instead of photocells.

Having regard to the foregoing disclosure, the following is claimed as inventive and patentable embodiments thereof:

1. A process for orienting logs having a root end and a crown end and arranged in a row so that all the logs in the row have their roots ends pointing in the same direction, which comprises arranging the logs in a row in a heterogeneous orientation; conveying the logs along a first conveying path; at a selected location along the first conveying path, gripping selected logs in sequence at approximately their mid-point intermediate the root and crown ends of the logs in a manner to permit turning them; and turning selected gripped logs about an axis passing through the gripping point intermediate the root and crown ends of the logs, as required to orient the logs in a homogeneous orientation with the root ends of all logs in the rows facing in the same direction, while maintaining continued conveying movement of the logs; and transferring the homogeneously oriented logs to and conveying the homogeneously oriented logs along a second conveying path.

2. A process in accordance with claim 1, which comprises maintaining conveying movement of the logs throughout the turning and transferring operations.

3. A process in accordance with claim 1 in which the logs are gripped at a point equidistant from both ends.

4. A process in accordance with claim 1, which comprises halting conveying movement of the logs after turning while placing the logs in position to be conveyed along the second conveying path.

5. A process in accordance with claim 1, which comprises turning the logs in a horizontal plane.

6. A process in accordance with claim 1, which comprises turning the logs in a non-horizontal plane.

7. A process in accordance with claim 1, which comprises conveying the logs along a path parallel to the horizontal.

8. A process in accordance with claim 1, which comprises conveying the logs along a path at an angle to the horizontal.

9. A process in accordance with claim 1, which comprises moving the logs along a path approximately parallel to the conveying paths, while gripping and turning the logs.

10. A process in accordance with claim 1, which comprises gripping all the logs and transferring all of the logs to a second conveying path, while turning only selected logs.

11. A process in accordance with claim 1, which comprises gripping only selected logs, turning the gripped logs, and transferring the turned logs to a second conveying path.

12. An apparatus for orienting logs having a root end and a crown end and arranged in a row in a heterogeneous orientation so that all the logs have their root ends pointing in the same direction, which comprises, in combination, a conveyor for conveying the logs arranged in a row one log after another log along the conveying path; means for gripping selected logs in sequence at a point intermediate their root and crown ends for removing selected logs from the row at one selected location along the conveying path, turning the selected logs about an axis passing through the gripping point intermediate the ends thereof, as required to orient the turned logs in a homogeneous orientation with the root ends of all the other logs in the row facing in the same direction, and returning the selected turned and homogeneously oriented logs to the row on the conveyor at another selected location along the conveying path, while maintaining continued conveying movement of the logs, and arranged to move along a path approximately parallel to the path of the conveyor and along an endless path, meeting the conveying path at the one and the other locations; and means for rotating the gripping means to turn the gripped logs about said axis.

13. An apparatus in accordance with claim 12 in which the gripping means comprise a plurality of downwardly-directed grippers securely holding the logs.

14. An apparatus in accordance with claim 12 which comprises a track defining a circular endless path, and a plurality of carriages movable along the track for carrying the gripping means along the circular endless path.

15. An apparatus in accordance with claim 12 in which each gripping means is supported at one end of an arm which is rotatably supported at its opposite end in a manner such that the gripping means is moved along the circular endless path when the arm rotates about its axis.

16. An apparatus in accordance with claim 12 comprising sensing means for detecting the facing direction of a root end of a log in the row and means for actuatng the gripping means for turning of the log only when the root end is facing the wrong way.

17. An apparatus in accordance with claim 12 comprising means for moving the gripping means at approximately the conveying speed while gripping the logs.

18. An apparatus in accordance with claim 12 comprising two conveyors, one for conveying the logs to the gripping means, and one for conveying the logs from the gripping means, the gripping means transferring the logs from one conveyor to the other, and turning selected logs while so doing.

19. An apparatus in accordance with claim 12, in which the two conveyors are arranged at an approximately 90° angle to each other, and the endless path of the gripping means carries the gripping means about a 90° arc during the transfer, thus reducing the turning arc of the selected turned logs.

20. An apparatus according to claim 19 in which the gripping means grasps each log, turns only selected logs, and transfers each log to the second conveyor.

21. An apparatus according to claim 12 in which the gripping means grasps only selected logs, turns them, and transfers the turned logs to the second conveyor.

22. An apparatus according to claim 21 in which the conveyor has two in-line sections, before and after the gripping means.

* * * * *